United States Patent
Zhang et al.

(10) Patent No.: US 12,165,634 B2
(45) Date of Patent: Dec. 10, 2024

(54) SPEECH RECOGNITION METHOD AND APPARATUS, DEVICE, STORAGE MEDIUM, AND PROGRAM PRODUCT

(71) Applicant: Tencent Technology (Shenzhen) Company Limited, Shenzhen (CN)

(72) Inventors: Xilin Zhang, Shenzhen (CN); Bo Liu, Shenzhen (CN); Shuo Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 267 days.

(21) Appl. No.: 17/979,660

(22) Filed: Nov. 2, 2022

(65) Prior Publication Data
US 2023/0070000 A1    Mar. 9, 2023

Related U.S. Application Data

(63) Continuation of application No. PCT/CN2022/082046, filed on Mar. 21, 2022.

(30) Foreign Application Priority Data

Apr. 26, 2021   (CN) .......................... 202110451736.0

(51) Int. Cl.
*G10L 15/16*   (2006.01)
*G10L 15/02*   (2006.01)

(52) U.S. Cl.
CPC .............. *G10L 15/16* (2013.01); *G10L 15/02* (2013.01); *G10L 2015/025* (2013.01)

(58) Field of Classification Search
USPC ...................................... 704/1–504
See application file for complete search history.

(56) References Cited

U.S. PATENT DOCUMENTS 11,145,293 B2 * 10/2021 Prabhavalkar .......... G10L 15/16
11,335,333 B2 *  5/2022 Han ....................... G10L 15/22
(Continued)

FOREIGN PATENT DOCUMENTS

CN    101645270 A    2/2010
CN    106104674 A    11/2016
(Continued)

OTHER PUBLICATIONS

Tencent Technology, Extended European Search Report, EP Patent Application No. 22794411.3, Apr. 23, 2024, 7 pgs.
(Continued)

*Primary Examiner* — Marcus T Riley
(74) *Attorney, Agent, or Firm* — Morgan, Lewis & Bockius LLP

(57) ABSTRACT

A computer device acquires speech content. The device performs feature extraction on the speech content to obtain an intermediate feature. The intermediate feature is used for indicating an audio expression characteristic of the speech content. The device decodes the intermediate feature based on an attention mechanism to obtain a first word graph network. The device performs feature mapping on the intermediate feature based on pronunciation of the speech content to obtain a second word graph network. The device determines a recognition result of the speech content according to candidate word connection relationships indicated by the first word graph network and the second word graph network.

20 Claims, 9 Drawing Sheets

(56) References Cited

U.S. PATENT DOCUMENTS

| | | | |
|---|---|---|---|
| 11,405,466 B2* | 8/2022 | Phipps | H04L 67/1095 |
| 11,526,368 B2* | 12/2022 | Karashchuk | G06F 40/166 |
| 11,556,230 B2* | 1/2023 | Van Os | G06F 3/04842 |
| 11,587,559 B2* | 2/2023 | Newendorp | H04N 21/266 |
| 11,947,873 B2* | 4/2024 | Orr | G06F 40/279 |
| 12,087,308 B2 | 9/2024 | Gruber | G10L 15/22 |
| 2008/0154600 A1* | 6/2008 | Tian | G10L 15/083 |
| | | | 704/E15.04 |
| 2008/0294584 A1* | 11/2008 | Herz | H04N 21/262 |
| | | | 348/E7.071 |
| 2014/0304205 A1* | 10/2014 | Fastow | G10L 15/32 |
| | | | 706/47 |
| 2019/0189115 A1 | 6/2019 | Hori et al. | |
| 2020/0000135 A1* | 1/2020 | Munsell | A61K 36/67 |
| 2020/0027444 A1* | 1/2020 | Prabhavalkar | G10L 15/02 |
| 2020/0126538 A1* | 4/2020 | Han | G10L 15/063 |
| 2020/0135174 A1 | 4/2020 | Cui et al. | |
| 2021/0020175 A1* | 1/2021 | Shao | G10L 15/22 |
| 2021/0056975 A1 | 2/2021 | Peng et al. | |
| 2021/0240938 A1* | 8/2021 | Kumar | G06N 3/08 |
| 2023/0070000 A1* | 3/2023 | Zhang | G10L 15/16 |

FOREIGN PATENT DOCUMENTS

| | | | | |
|---|---|---|---|---|
| CN | 110164416 A | | 8/2019 | |
| CN | 110534095 A | | 12/2019 | |
| CN | 110808032 A | | 2/2020 | |
| CN | 110970031 A | | 4/2020 | |
| CN | 111933125 A | | 11/2020 | |
| CN | 112509564 A | | 3/2021 | |
| CN | 112863489 A | | 5/2021 | |
| EP | 4231283 A1 * | | 8/2023 | ............ G10L 15/02 |
| WO | WO-2022227935 A1 * | | 11/2022 | ............ G10L 15/02 |

OTHER PUBLICATIONS

Peng Li et al., "Keyword Spotting Using the Lattice Intersection Fusion", Journal of Signal Processing, vol. 31, No. 6, Jun. 30, 2015, 8 pgs.

Tencent Technology, ISR, PCT/CN2022/082046, May 11, 2022, 3 pgs.

Tencent Technology, WO, PCT/CN2022/082046, May 11, 2022, 4 pgs.

Tencent Technology, Iprp, PCT/CN2022/082046, Oct. 24, 2023, 5 pgs.

\* cited by examiner

SPEECH RECOGNITION METHOD AND APPARATUS, DEVICE, STORAGE MEDIUM, AND PROGRAM PRODUCT

CROSS-REFERENCE TO RELATED APPLICATIONS

This application is a continuation application of PCT Patent Application No. PCT/CN2022/082046, entitled "VOICE RECOGNITION METHODS, DEVICES, DEVICES, STORAGE MEDIA AND PROGRAM PRODUCTS" filed on Mar. 21, 2022, which claims priority to Chinese Patent Application No. 202110451736.0, filed with the State Intellectual Property Office of the People's Republic of China on Apr. 26, 2021, and entitled "SPEECH RECOGNITION METHOD AND APPARATUS, DEVICE, AND STORAGE MEDIUM", all of which are incorporated herein by reference in their entirety.

FIELD OF THE TECHNOLOGY

This application relates to the field of computer technologies, and in particular, to a speech recognition method and apparatus, a device, a storage medium, and a program product.

BACKGROUND OF THE DISCLOSURE

Speech recognition refers to the recognition and translation of spoken speech information into text. Many applications provide speech-to-text service. Speech recognition includes streaming speech recognition and non-streaming speech recognition, with streaming speech recognition having higher requirements for real-time performance than non-streaming speech recognition. For non-streaming speech recognition, a common speech recognition system includes a conventional speech recognition system and an end-to-end (E2E) speech recognition system.

In the related art, the conventional speech recognition system converts speech information into text information through sequential mapping relationships between speech features, phonemes, words, and strings. The conventional speech recognition system includes an acoustic model, a pronunciation dictionary, a language model, and other models. The E2E speech recognition system uses a multi-head attention mechanism between an input end and an output end to implement work contents corresponding to multiple models in the conventional speech recognition system described above.

However, the conventional speech recognition system includes multiple models, and due to an information loss in the information transfer between various models, the corresponding recognition performance is limited in certain degree, which results in low recognition accuracy.

SUMMARY

Embodiments of this application provide a speech recognition method and apparatus, a device, a computer readable storage medium, and a program product. The technical solutions are as follows:

According to an aspect, a speech recognition method performed by a computer device is provided. The method includes:

acquiring a speech content, where the speech content is audio content to be recognized;

performing feature extraction on the speech content to obtain an intermediate feature, the intermediate feature being used for indicating an audio expression characteristic of the speech content;

decoding the intermediate feature based on an attention mechanism to obtain a first word graph network, the first word graph network being used for indicating a first candidate sequence set including first candidate words predicted based on the attention mechanism;

performing feature mapping on the intermediate feature based on pronunciation of the speech content to obtain a second word graph network, the second word graph network being used for indicating a second candidate sequence set including second candidate words obtained based on the pronunciation; and determining a recognition result of the speech content according to candidate word connection relationships indicated by the first word graph network and the second word graph network.

According to another aspect, a speech recognition apparatus is provided. The apparatus includes:

an acquisition module, configured to acquire a speech content, where the speech content is a to-be-recognized audio;

a processing module, configured to perform feature extraction on the speech content to obtain an intermediate feature, the intermediate feature being used for indicating an audio expression characteristic of the speech content;

a first generation module, configured to decode the intermediate feature based on an attention mechanism to obtain a first word graph network, the first word graph network being used for indicating a first candidate sequence set that includes first candidate words predicted based on the attention mechanism;

a second generation module, configured to perform feature mapping on the intermediate feature based on pronunciation of the speech content to obtain a second word graph network, the second word graph network being used for indicating a second candidate sequence set that includes second candidate words obtained based on the pronunciation; and a determining module, configured to determine a recognition result of the speech content according to candidate word connection relationships indicated by the first word graph network and the second word graph network.

According to another aspect, a computer device is provided, including a processor and a memory, the memory storing at least one computer program, the at least one computer program being loaded and executed by the processor to implement the speech recognition method according to any one of the embodiments of this application.

According to another aspect, a non-transitory computer-readable storage medium is provided, storing at least one piece of program code, the at least one piece of program code being loaded and executed by a processor to implement the speech recognition method according to any one of the embodiments of this application.

According to another aspect, a computer program product is provided, including at least one computer program, the computer program being loaded and executed by a processor to implement the speech recognition method according to any one of the embodiments of this application.

The technical solutions provided in this application include at least the following beneficial effects:

For a to-be-recognized speech content, feature extraction is performed on the speech content to obtain an intermediate feature that can indicate an audio expression characteristic of the speech content. Then the intermediate feature is processed in two different manners to obtain two word graph networks. The two different processing manners include decoding the intermediate feature based on an attention mechanism to obtain a first word graph network, and performing feature mapping based on pronunciation of the speech content to obtain a second word graph network, the first word graph network and second word graph network being used for indicating candidate sequence sets including candidate words obtained in the foregoing two processing manners. Finally, a recognition result is determined according to candidate word connection relationships indicated by the first word graph network and the second word graph network, so as to implement the function of converting the speech content into a text content. Because the first word graph network and the second word graph network are obtained based on the same intermediate feature, server resources can be saved. In addition, the intermediate feature is processed in different manners, and a processing result is determined jointly according to the word graph networks obtained in the two processing manners, thereby improving the accuracy of the speech recognition.

DESCRIPTION OF EMBODIMENTS

Figure 1:
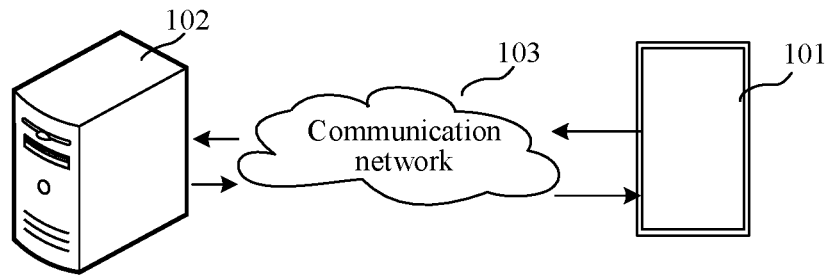
FIG. 1 is a schematic diagram of an implementation environment according to an exemplary embodiment of this application.

For example, an implementation environment in this embodiment of this application is described. Referring to FIG. 1, the implementation environment includes a terminal 101, a server 102, and a communication network 103.

The terminal 101 may be an electronic device, such as a smartphone, a tablet computer, an e-book reader, a multimedia player, a wearable device, a laptop portable computer, a desktop computer, or a speech recognition integrated machine. For example, an application for speech recognition is installed in the terminal 101. The application can implement conversion of a to-be-recognized speech content into text. The speech recognition application may be conventional application software or cloud application software, and may be implemented as an applet or application module in a host application, or as a web platform, which is not limited herein.

The server 102 is configured to provide speech recognition service to the terminal 101. The terminal 101 transmits a speech content to be recognized to the server 102 through the communication network 103, and correspondingly, the server 102 receives the speech content uploaded by the terminal 101. The server 102 calls a speech recognition model to recognize the speech content, generates a corresponding text content, and returns the text content to the terminal 101 through the communication network 103. In some embodiments, the server 102 is a physical server or a cloud server.

In some embodiments, the server 102 may be implemented as a node in a blockchain system.

The server 102 may establish a communication connection with the terminal 101 through the communication network 103. The network may be a wireless network, or a wired network.

With reference to the foregoing implementation environment, an application scenario of this embodiment of this application is described.

The speech recognition method provided in the embodiments of this application can be used in a streaming speech recognition service or a non-streaming speech recognition service. In the embodiments of this application, the method being applied in the non-streaming speech recognition service is used as an example for description. For example, the speech recognition method provided in the embodiments of this application is applicable to, but not limited to, at least one of the following scenarios.

Figure 2:
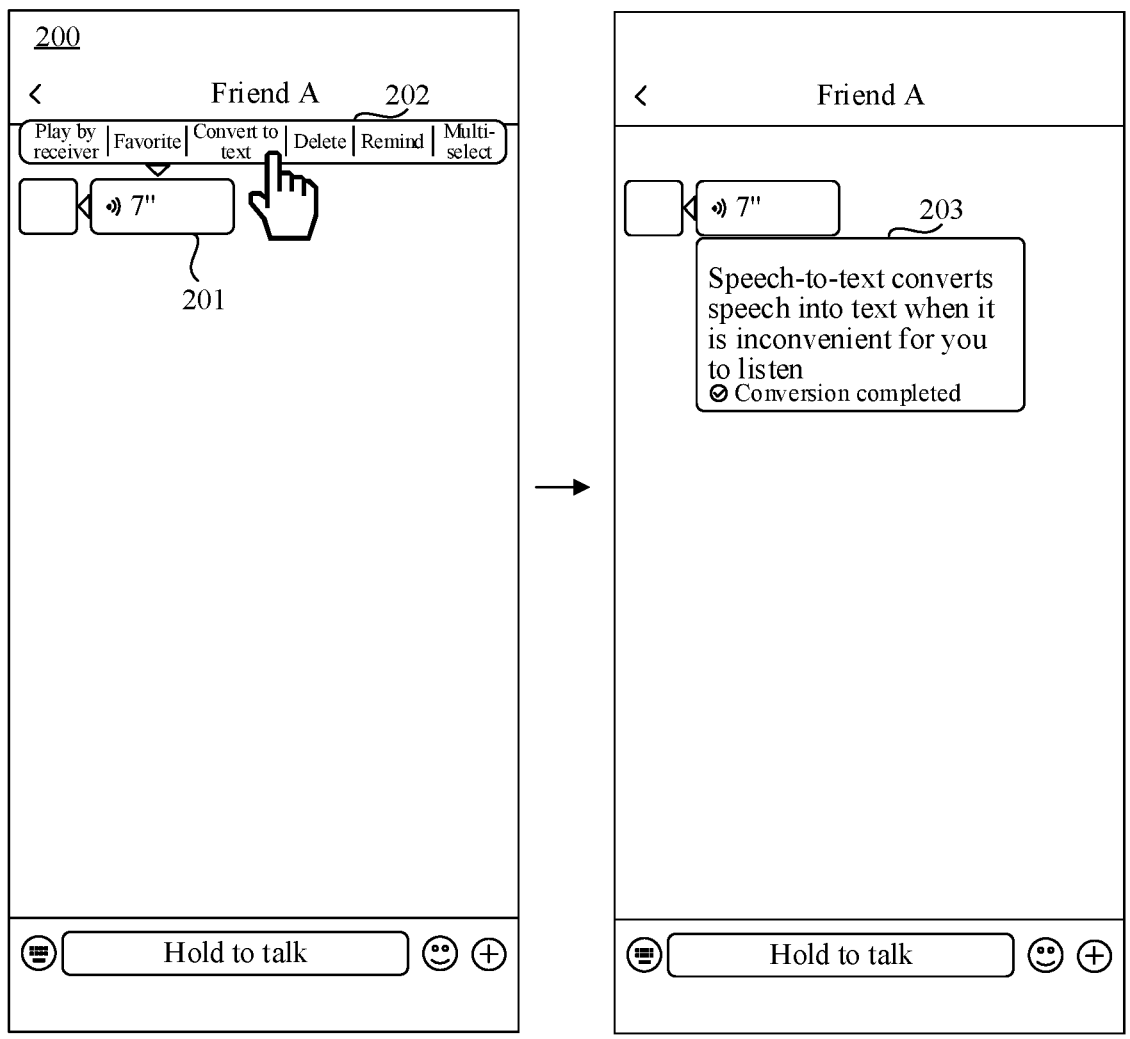
FIG. 2 is a schematic diagram of an application scenario of speech recognition according to an exemplary embodiment of this application.

In the first scenario, the speech recognition service is applied to a scenario of converting received speech information into a text in social software. For example, a target object (e.g., a user, a recipient, etc.) receives speech information in the social software, for example, a speech bar transmitted by another other object during a chat, or a speech update posted by another object in an update interface. The target object can convert the speech content into a text content for display through the speech recognition service, ensuring that the target object can also acquire a message content of the speech content in time when it is not convenient to receive the information by playing the speech. As shown in FIG. 2, in a chat interface 200, the target object receives speech information 201 transmitted by another object. The target object can call a menu control 202 by long-pressing a control corresponding to the speech information 201, and the menu control 202 includes a sub-control for providing a speech-to-text service. The target object causes the received speech information to be converted into text information by clicking the sub-control. When receiving a triggering operation on the sub-control, the terminal uploads the speech signal to the server. The server performs the speech recognition, converts the speech signal into text information, and returns the text information to the terminal. The terminal receives the text information returned by the server and displays the returned text information in a preset region 203 in the chat interface 200.

Figure 3:
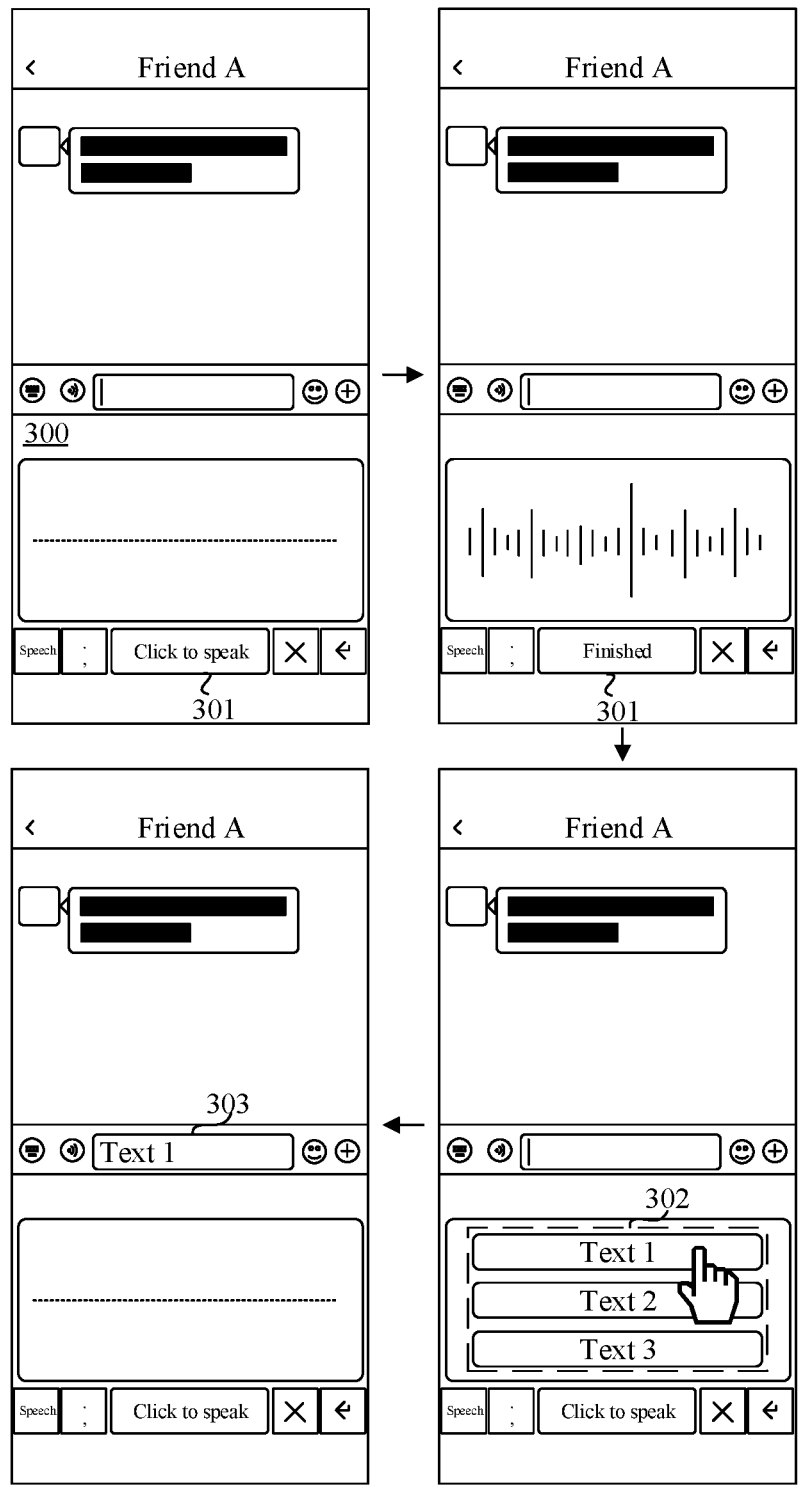
FIG. 3 is a schematic diagram of an application scenario of speech recognition according to another exemplary embodiment of this application.

In the second scenario, the speech recognition service is applied to a speech input function provided by input method software. For example, the target object inputs a speech through a preset control in the input method software. The terminal transmits a collected speech signal to the server. The server processes the speech signal to obtain text information corresponding to the speech signal, and returns the text information to the terminal; the terminal displays the text information as a speech input content of the target object. For example, the server can return one piece of text information, or return multiple pieces of similar text information determined based on the speech information and provide the multiple pieces of text information to the target object for selection. As shown in FIG. 3, in an input software region 300, the target object can input a speech through a speech input control 301. After the target object clicks on the speech input control 301, the terminal calls a microphone to record speech information of the target object. After the target object clicks on the speech input control 301 again, the terminal determines that recording of the speech information has been finished, and uploads the speech information to the server. The server feedbacks recognized multiple pieces of text information 302, and the terminal displays the multiple pieces of text information 302. The target object can select desired text information from the multiple pieces of text information 302, and the text information selected by the target object from the multiple pieces of text information 302 is displayed in an input box 303.

In the third scenario, the speech recognition service is applied to a subtitle auto-generation function in video software. For example, the target object releases a video through the video software. Before a target video is released, the target video is uploaded to the video software. The video software can provide some video processing functions for the target object, which may include the subtitle auto-generation function. The server performs audio extraction of the received target video, and performs speech recognition on the audio to generate text information, and returns the text information to the terminal. The target object can select the generated text information as a subtitle of the target video to be added to the target video.

For example, the speech recognition method provided in this application is also applicable to other application scenarios. The scenarios herein are merely used as examples for description, and the specific application scenario is not limited.

In this embodiment of this application, in the case of speech recognition of a speech content, in order to ensure the legitimacy of the speech recognition operation, the server may instruct the terminal to display authorization inquiry information on a terminal interface, and after receiving a confirmation operation based on the authorization inquiry information, the server confirms that a processing authority of relevant information corresponding to the authorization inquiry information is acquired.

The authorization inquiry information may include at least one of message content authorization inquiry information or input speech authorization inquiry information. When the authorization inquiry information includes message content authorization inquiry information, after the server receives a confirmation operation for the authorization inquiry information by the target object, it is determined that speech information received by the target object in social software can be obtained; when the authorization inquiry information includes input speech authorization inquiry information, after the server receives a confirmation operation for the authorization inquiry information by the target object, it is determined that a speech content inputted by the target object can be obtained. This application does not limit a content of the authorization inquiry information.

Figure 4:
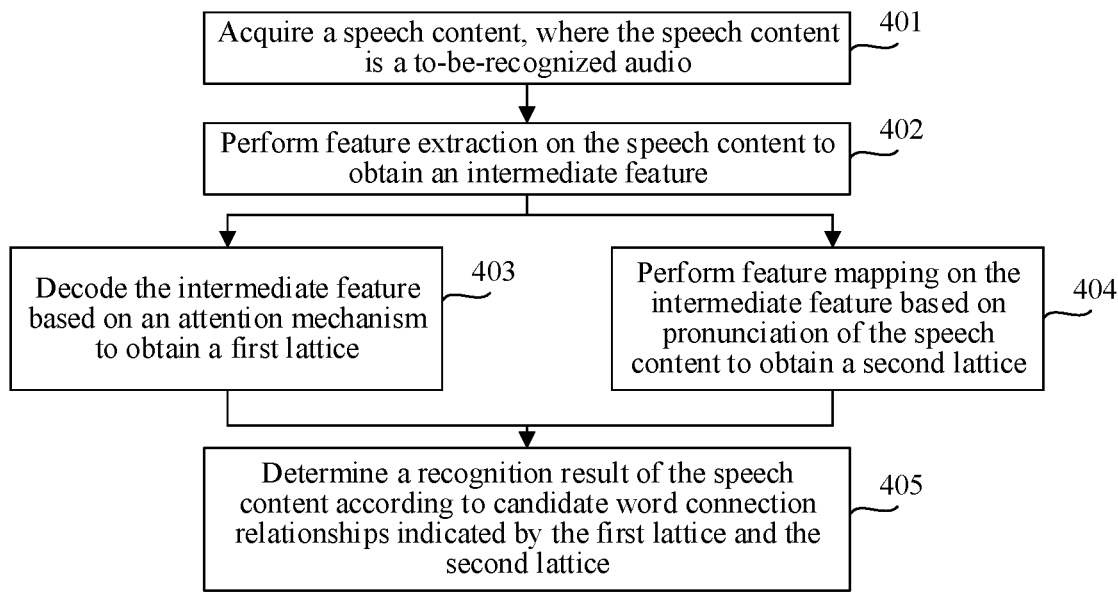
FIG. 4 is a flowchart of a speech recognition method according to an exemplary embodiment of this application.

Referring to FIG. 4, FIG. 4 is a flowchart for a speech recognition method according to an exemplary embodiment of this application. In the embodiments of this application, the speech recognition method may be performed by a computer device. The method being executed by a server in the implementation environment is used as an example for description. The method includes the following steps.

Step 401. Acquire a speech content, where the speech content is audio content to be recognized.

The server acquires speech content, where the speech content comprises audio whose content is to be recognized.

In some embodiments, a terminal compresses a recorded audio, packages a compressed audio and a speech-to-text request by using a network protocol, and transmits the compressed audio and speech-to-text request to the server through a communication network. After receiving the speech-to-text request transmitted by the terminal, the server decompresses the compressed audio corresponding to the speech-to-text request to obtain the speech content to be recognized. For example, the server can also acquire the speech content from a database, which is not limited herein.

After acquiring the speech content, the server calls a speech recognition model to recognize the speech content according to the speech-to-text request.

Step 402. Perform feature extraction on the speech content to obtain an intermediate feature.

The intermediate feature is used for indicating an audio expression characteristic of the speech content.

In this embodiment of this application, the speech recognition model includes a shared network sub-model, which is used for performing feature extraction on the speech content to obtain the intermediate feature for indicating the audio expression characteristic of the speech content. That is, the server may perform feature extraction on the speech content through the shared network sub-model in the speech recognition model to obtain the intermediate feature. The speech recognition model may be referred to as a speech recognition module, and the shared network sub-model may be referred to as a shared network sub-module.

For example, the shared network sub-model includes at least one layer of convolutional neural network (CNN). The server may perform feature extraction on the speech content through the at least one layer of convolutional neural network included in the shared network sub-model to obtain intermediate sub-features, and then perform feature weighting on the intermediate sub-feature to obtain the intermediate feature.

For example, before being input to the shared network sub-model, the speech content needs to be pre-processed. The pre-processing includes transforming the speech content into a speech feature sequence, that is, a feature extracted through a signal processing technology from a speech signal corresponding to the inputted speech content is provided for the shared network sub-model in the form of a feature vector for subsequent processing, to minimize impact of factors such as environmental noise, channels, and speaker on the feature extraction. In an example, the pre-processing includes at least one of denoising, sampling, pre-emphasis, windowing and framing, and the like. The denoising is to perform noise reduction on the speech signal through a preset filter to ensure the accuracy of recognition of a human speech in the speech signal. The sampling is to convert the speech signal from an analog signal into a digital signal. The pre-emphasis is to emphasize a high-frequency part of the speech, remove the impact of lip radiation, and increase a high-frequency resolution of the speech. The windowing and framing is to weight the speech signal with a movable limited-length window, and then perform transformation or computing on each frame through a relevant filter to divide the speech signal into a number of short segments (analysis frames) for processing.

The speech feature sequence obtained by pre-processing the speech content is input into the shared network sub-model to obtain the intermediate feature. For example, the shared network sub-model includes at least one layer of convolutional neural network that can perform feature extraction on the speech content to obtain the intermediate sub-features. The intermediate sub-feature is a characteristic expression at a higher level than the speech feature sequence.

The shared network sub-model further includes a transformer (deep self-attention transformation network). The transformer acquires the intermediate sub-features, and performs weighting on the intermediate sub-features at least once based on a self-attention mechanism, to output the intermediate feature. For example, the shared network sub-model may further include at least one of a long short-term memory (LSTM) network, a bi-directional long short-term memory (BLSTM) network, or a deep feedforward sequential memory network (DFSMN) to process the intermediate sub-features to obtain the intermediate feature, which is not limited herein.

Step 403. Decode the intermediate feature based on an attention mechanism to obtain a first word graph network (e.g., a word map, a lattice, etc.).

In a hidden layer of a neural network, the attention mechanism adjusts a direction of attention and a weighting model according to a specific task objective. With the weighting based on the attention mechanism (e.g., increasing the weight of the attention mechanism), contents that do not conform to the attention model are weakened or forgotten. If the direction of attention is based on itself, it is referred to as a self-attention mechanism. The input is divided into multiple heads to form multiple subspaces. After the attention mechanism is implemented in each subspace, the heads are recombined, which is referred to as multi-headed attention (MHA). The multi-headed attention mechanism allows the model to learn relevant information in different subspaces.

The first word graph network is used to indicate a first candidate sequence set including (e.g., composed of) first candidate words predicted based on the attention mechanism.

In this embodiment of this application, the speech recognition model includes an E2E network sub-model, where the E2E network sub-model is used for decoding the intermediate feature based on the attention mechanism to obtain the first word graph network. That is, the server can decode the intermediate feature through the E2E network sub-model based on the attention mechanism to obtain the first word graph network. For example, the E2E network sub-model can perform, based on the attention mechanism, feature weighting on channels indicating human speech expressions in the intermediate feature to obtain a first branch feature, and decode the first branch feature to obtain the first word graph network. The E2E network sub-model may be referred to as an E2E network sub-module. The E2E network sub-model is configured to a recognition model that implements end-to-end speech recognition through a neural network based on the attention mechanism.

For example, the E2E network sub-model includes an attention processing layer. The attention processing layer serves as a hidden layer in the whole E2E network and is used for adjusting the direction of attention during the feature processing and a feature weighting model according to a preset task objective. That is, by adding a feature weighting operation based on the attention mechanism, speech features that do not conform to the direction of attention are weakened or forgotten. The direction of attention is determined during training of the speech recognition model. Therefore, after receiving the intermediate feature, the E2E network sub-model inputs the intermediate feature to the attention processing layer to obtain the first branch feature.

The attention processing layer can be implemented as an attention-based encoder-decoder (AED) model, which is configured to resolve a sequence-to-sequence mapping problem. An E2E speech recognition system is constructed by controlling a non-isometric mapping between encoded and decoded sequences through the MI-IA.

Figure 5:
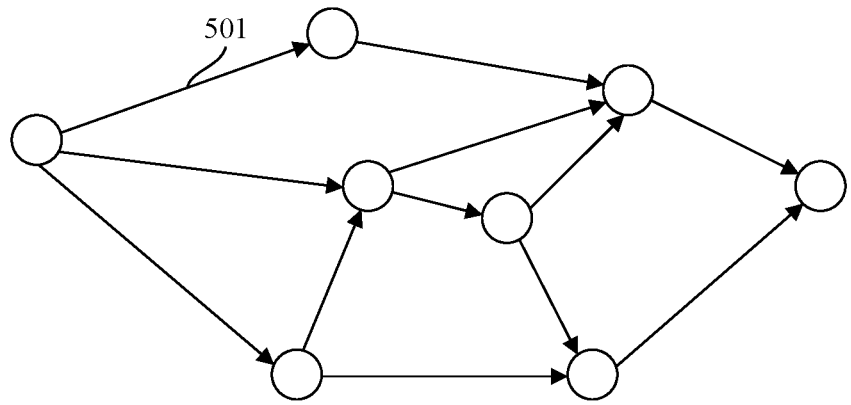
FIG. 5 is a schematic diagram of a form of a first word graph network according to an exemplary embodiment of this application.

For example, the E2E network sub-model further includes a decoding network. The decoding network is used for decoding the first branch feature to obtain the first word graph network. In an example, the attention processing layer implements a non-isometric mapping between the intermediate feature and the first branch feature. The decoding network decodes the first branch feature, determines the first candidate sequence set including the first candidate words, that is, multiple optimal candidate paths (N-best), and generates the first word graph network according to the multiple optimal candidate paths. That is, the decoder decodes the first branch feature to obtain the first candidate sequence set; and the first word graph network is generated by using the first candidate words corresponding to the first candidate sequence set as paths. The decoder is pre-trained by the speech recognition system using training data. Saving N-best in the form of a word graph network can prevent taking up excessive content space. A word graph network is essentially a directed acyclic graph in which each node represents an end time point of a candidate word determined by the first branch feature, and each edge represents a possible candidate word and a score of the candidate word, the score of the candidate word being used for indicating a possibility that the candidate word is determined as a word in the processing result. In an example, FIG. 5 shows a form of a first word graph network 500, where an edge 501 between nodes in the first word graph network 500 represents a first candidate word and a score of the first candidate word.

Step 404. Perform feature mapping on the intermediate feature based on pronunciation of the speech content to obtain a second word graph network.

The second word graph network is used for indicating a second candidate sequence set including second candidate words obtained based on the pronunciation.

In this embodiment of this application, the speech recognition model further includes an acoustic processing sub-model, which is used for performing feature mapping on the intermediate feature based on the pronunciation to obtain the second word graph network. That is, the server may perform feature mapping on the intermediate feature through the acoustic processing sub-model based on the pronunciation of the speech content to obtain the second word graph network.

For example, the process of performing feature mapping on the intermediate feature through the acoustic processing sub-model based on the pronunciation of the speech content to obtain the second word graph network may be implemented as follows:
   determining a target word set of the to-be-recognized speech based on the intermediate feature; and
   generating the second word graph network based on the target word set.

For example, after receiving the intermediate feature, the acoustic processing sub-model inputs the intermediate feature into a fully-connected layer to obtain posterior probabilities of phonemes of the to-be-recognized speech, and determines the target word set based on the posterior probabilities of the phonemes, where the phoneme is used for indicating a minimum phonetic unit divided according to a natural attribute of the speech. In an example, the fully-connected layer includes a softmax function.

In this embodiment of this application, the acoustic processing sub-model further includes a pronunciation dictionary unit. The pronunciation dictionary unit may determine the target word set of the to-be-recognized speech according to the posterior probabilities of the phonemes of the received to-be-recognized speech. For example, a pronunciation dictionary is stored in the pronunciation dictionary unit, and the pronunciation dictionary records a word set and pronunciations corresponding to words in the word set. That is, the pronunciation dictionary includes a mapping relationship between words and pronunciations.

Based on this, the process of determining the target word set based on the posterior probabilities of the phonemes may be implemented as follows:
   acquiring a pronunciation dictionary;
   determining phonemes at each time point in the speech content according to the posterior probabilities of the phonemes; and
   determining the target word set including the phonemes at each time point according to the pronunciation dictionary.

In this embodiment of this application, the acoustic processing sub-model further includes a language model unit. The language model unit is configured to determine a second candidate sequence set of the target word set based on the target word set determined by the pronunciation dictionary unit. For example, the language model unit may include at least one of the following language models: an n-gram language model, a feedforward neural network-based model, and a recurrent neural network-based model, and may include other language models, which is not limited herein. When a second candidate sequence formed by the target word set is determined, the language model may calculate a possibility of existence of the second candidate sequence.

In this embodiment of this application, the form of the second word graph network is the same as that of the first word graph network. Details are not described herein.

In this embodiment of this application, the intermediate feature is simultaneously inputted to the E2E network sub-model and the acoustic processing model in the speech recognition model; that is, the process of acquiring the first word graph network and the second word graph network can be performed simultaneously.

Step 405. Determine a recognition result of the speech content according to candidate word connection relationships indicated by the first word graph network and the second word graph network.

In this embodiment of this application, the first word graph network indicates the first candidate sequence set including the first candidate words predicted based on the attention mechanism, and the second word graph network indicates the second candidate sequence set including the second candidate words predicted based on the pronunciation. That is, the first word graph network indicates connection relationships between the first candidate words, and the second word graph network indicates connection relationships between the second candidate words.

In this embodiment of this application, the speech recognition model further includes a result generation sub-model, which is used for processing output results of the E2E network sub-model and the acoustic processing sub-model to generate a recognition result of the speech content. The result generation sub-model may be referred to as a result generation sub-module.

For example, the result generation sub-model receives the first word graph network and the second word graph network, and determines a candidate sequence set according to the first word graph network and the second word graph network. In an example, the candidate sequence set includes candidate sequences corresponding to the first candidate sequence set and candidate sequences corresponding to the second candidate sequence set. Or, the server may acquire n candidate sequences from each of the first candidate sequence set and the second candidate sequence set, and determine 2n candidate sequences as a candidate sequence set, where n is a positive integer. In an example, the server may determine the candidate sequence set based on sequence scores of first candidate sequences in the first candidate sequence set or sequence scores of second candidate sequences in the second candidate sequence set, where the sequence score is determined by scores of candidate words forming the sequence. The result generation sub-model may determine at least one candidate sequence from the candidate sequence set as a recognition result.

For example, the result generation sub-model may also generate a target confusion network according to the first word graph network and the second word graph network, and the recognition result is determined by the target confusion network. The target confusion network includes connection probabilities between third candidate words forming the candidate sequence, where the third candidate words are determined from the first candidate words and the second candidate words, and the connection probabilities between the third candidate words are obtained by performing weighted combination on first connection relationships between the first candidate words and second connection relationships between the second candidate words. The third candidate words corresponding to the target confusion network may be a union set of the first candidate words and the second candidate words, or may include a preset number of first candidate words and a preset number of second candidate words, where the preset number of the first candidate words and the preset number of the second candidate words may be same or different. Using the third candidate words consisting of the preset number of the first candidate words and the preset number of the second candidate words as an example, a preset number of candidate words are selected from the first candidate words and a preset number of candidate words are selected from the second candidate words in accordance with a preset rule, the candidate words selected from the first candidate words and the candidate words selected from the second candidate words are united to obtain third candidate words, and the third candidate words form the target confusion network. The preset rule may be determined according to weights of the E2E network sub-model and the acoustic processing sub-model. Each edge between nodes in the target confusion network corresponds to a third candidate word and a score of the third candidate word, where the score of the third candidate word is used for indicating a connection probability between the third candidate word and a front or rear candidate word. The connection probability is determined by the first connection relationship and the second connection relationship. The connection probability is used for indicating a probability of a connection relationship between the third candidate word and the front or rear candidate word.

The target confusion network determines the recognition result in the following manner: traversing each node of the target confusion network from left to right, and connecting edges corresponding to candidate words with highest scores between two nodes to form a path. The path is a highest-score path in the target confusion network, and a candidate sequence formed by the path is the recognition result of the speech content.

Figure 6:
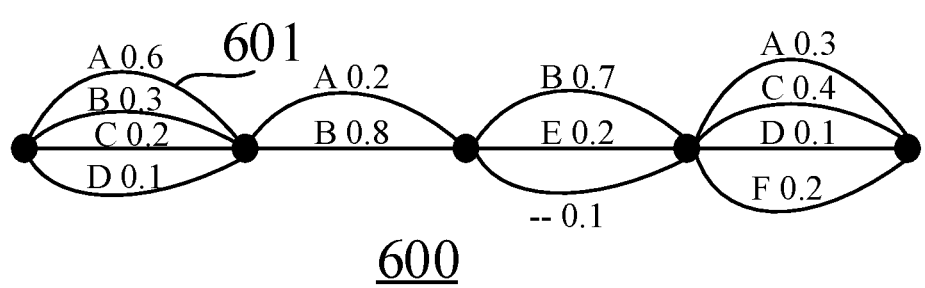
FIG. 6 is a schematic diagram of a form of a confusion network according to an exemplary embodiment of this application.

FIG. 6 shows a form of a confusion network 600. The confusion network 600 includes multiple nodes, and a line 601 between nodes corresponds to an edge in the word graph network. That is, each line 601 represents a candidate word and a score of the candidate word, and the score is used for indicating a connection probability between candidate words. In an example, the target confusion network is the confusion network 600 shown in FIG. 6, and a processing result determined according to the candidate word connection probabilities indicated by the confusion network 600 is ABBC.

The method of generating a confusion network from a word graph network includes: step a, selecting a path with a highest weight from the word graph network as an initial confusion network, where a node in the path is a node in the confusion network; step b, gradually adding other edges to the initial confusion network in an aligned manner, merging edges of the same position and the same word, and adding up weights.

In this embodiment of this application, the result generation sub-model can also generate a first confusion network according to the first word graph network, generate a second confusion network according to the second word graph network, and perform weighted combination on the first confusion network and the second confusion network according to a preset weighting rule to obtain the target confusion network. For example, the preset weighting rule is preset by a system. In an example, the process of weighted combination of the first confusion network and the second confusion network includes: Step a. Multiply each edge on the first word graph network by a coefficient m, and multiply each edge on the second word graph network by a coefficient (1-m). A value range of m is [0, 1], for example, m=0.49 or m=0.5. If m is greater than 0.5, the final processing result of the speech recognition model focuses on the processing result of the E2E network sub-model; if m is less than 0.5, the final processing result of the speech recognition model focuses on the processing result of the acoustic processing sub-model. Step b. Merge the first word graph network and the second word graph network after multiplication with the coefficients. In an example, a confusion network corresponding to the weighted second word graph network is used as an initial confusion network, and with the initial confusion network as a starting point, each edge on the weighted first word graph network is added to the initial confusion network in an aligned manner until all the edges are added.

Figure 7:
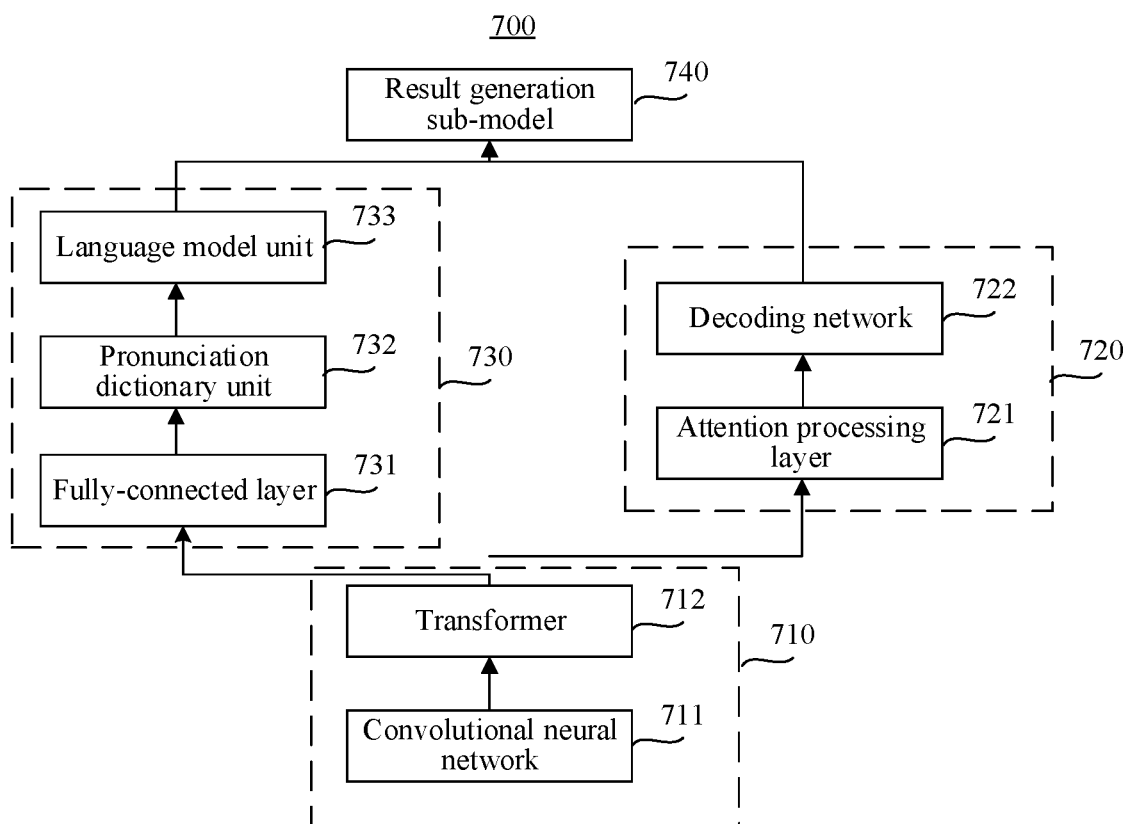
FIG. 7 is a schematic structural diagram of a speech recognition model according to an exemplary embodiment of this application.

For example, FIG. 7 shows a structure of the speech recognition model 700. Speech information is inputted to a shared network sub-model 710, and the shared network sub-model 710 performs feature extraction on the speech information to obtain an intermediate feature, where the shared network sub-model 710 includes a convolutional neural network 711 and a transformer 712. The intermediate feature is simultaneously inputted to an E2E network sub-model 720 and an acoustic processing sub-model 730. The E2E network sub-model 720 processes the intermediate feature to output a first word graph network, and inputs the first word graph network to a result generation sub-model 740, where the E2E network sub-model 720 includes an attention processing layer 721 and a decoder 722. The acoustic processing sub-model 730 processes the intermediate feature to output a second word graph network, and inputs the second word graph network to the result generation sub-model 740, where the acoustic processing sub-model 730 includes a fully-connected layer (softmax) 731, a pronunciation dictionary unit (Lexicon) 732, and a language model unit (LM) 733. The result generation sub-model 740 generates a processing result according to the first word graph network and the second word graph network. The processing result includes at least one piece of text information corresponding to the speech content.

In summary, in the speech recognition method provided in this embodiment of this application, for a to-be-recognized speech content, feature extraction is performed on the speech content to obtain an intermediate feature that can indicate an audio expression characteristic of the speech content. Then the intermediate feature is processed in two different manners to obtain two word graph networks, where the two different processing manners include decoding the intermediate feature based on an attention mechanism to obtain a first word graph network, and performing feature mapping based on pronunciation of the speech content to obtain a second word graph network, the first word graph network and second word graph network being used for indicating candidate sequence sets including candidate words obtained in the foregoing two processing manners. Finally, a recognition result is determined according to candidate word connection relationships indicated by the first word graph network and the second word graph network, so as to implement the function of converting the speech content into a text content. Because the first word graph network and the second word graph network are obtained based on the same intermediate feature, server resources can be saved. In addition, the intermediate feature is processed in different manners, and a processing result is determined jointly according to the word graph networks obtained in the two processing manners, which improves the accuracy of the speech recognition.

Figure 8:
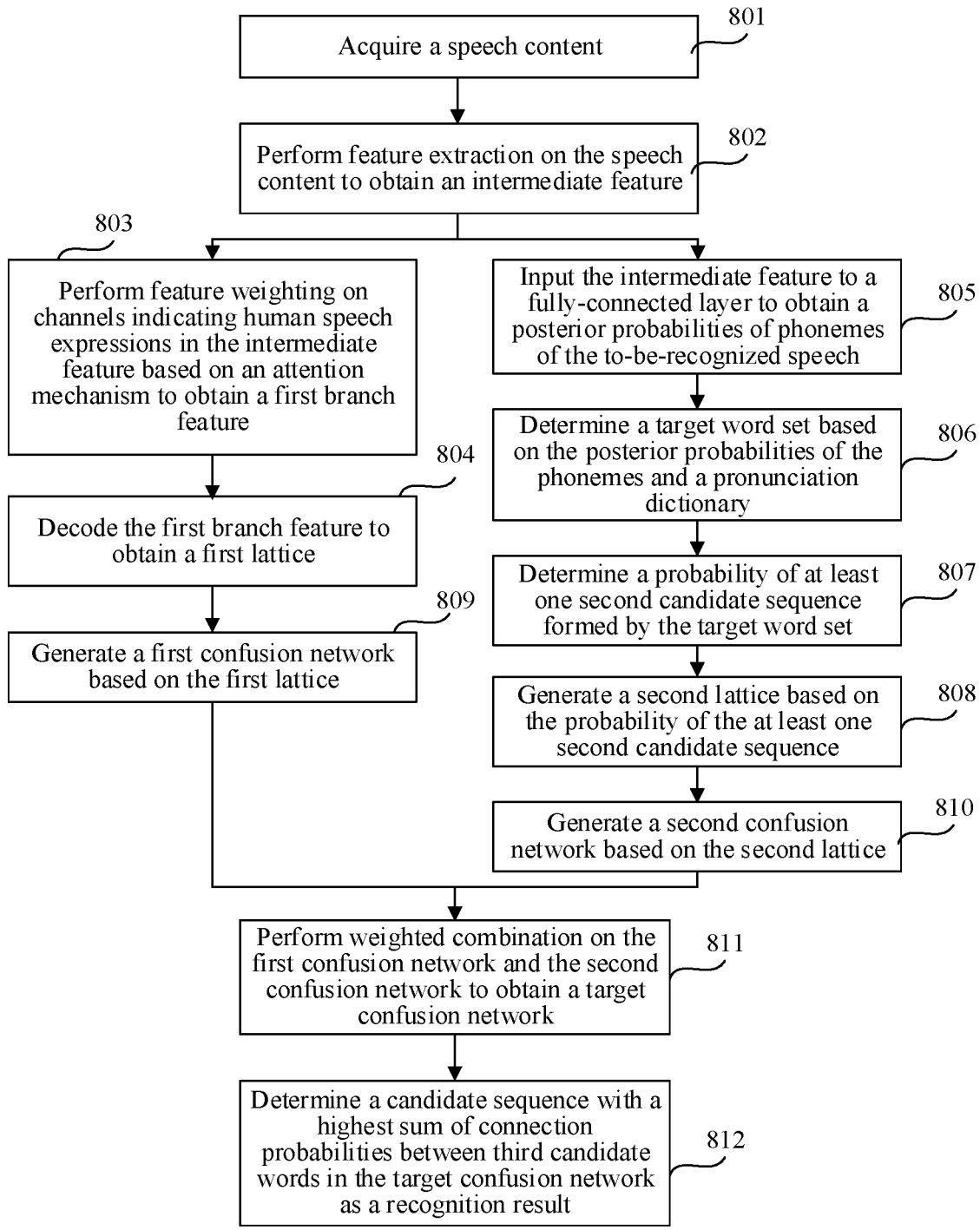
FIG. 8 is a flowchart of a speech recognition method according to an exemplary embodiment of this application.

FIG. 8 is a flowchart of a speech recognition method according to an exemplary embodiment of this application. The speech recognition method may be performed by a computer device and includes the following steps.

Step 801. Acquire a speech content.

The speech content is a to-be-recognized audio. For example, the server can acquire the speech content from a terminal or from a database, which is not limited herein.

Step 802. Perform feature extraction on the speech content to obtain an intermediate feature.

In this embodiment of this application, feature extraction may be performed on the speech content through a shared network sub-model in a speech recognition model to obtain the intermediate feature.

The intermediate feature is used for indicating an audio expression characteristic of the speech content; the intermediate feature is simultaneously inputted to an end-to-end E2E network sub-model and an acoustic processing sub-model in the speech recognition model.

The speech content is pre-processed to obtain a speech feature sequence. Feature extraction is performed on the feature sequence through a shared network including at least one layer of convolutional neural network and a transformer to obtain the intermediate feature.

Based on the intermediate feature, a first word graph network is obtained by steps 803 to 804, and a second word graph network is obtained by steps 805 to 808.

Step 803. Perform, based on an attention mechanism, feature weighting on channels indicating human speech expressions in the intermediate feature to obtain a first branch feature.

In this embodiment of this application, feature weighting may be performed on the channels indicating the human speech expressions in the intermediate feature through the E2E network sub-model based on the attention mechanism to obtain the first branch feature.

The intermediate feature is weighted through the attention mechanism according to the direction of attention during the speech recognition to obtain the first branch feature.

Step 804. Decode the first branch feature to obtain a first word graph network.

The first branch feature is decoded by a decoder. The decoder determines first candidate words and a score of the first candidate word at each time node corresponding to the speech information according to the first branch feature. The first word graph network is generated according to the first candidate words and the scores of the first candidate words. The first word graph network is used for indicating a first candidate sequence set including the first candidate words predicted based on the attention mechanism.

Step 805. Input the intermediate feature to a fully-connected layer to obtain posterior probabilities of phonemes of the to-be-recognized speech.

For example, the fully-connected layer includes a softmax function.

Step 806. Determine a target word set based on the posterior probabilities of the phonemes and a pronunciation dictionary.

For example, according to a mapping relationship between words and pronunciations recorded in the pronunciation dictionary, the first candidate words included in the speech content are determined according to the posterior probabilities of the phonemes of the to-be-recognized speech, and the first candidate words form the target word set. That is, a pronunciation dictionary including a mapping relationship between words and pronunciations; phonemes at each time point in the speech content are determined according to the posterior probabilities of the phonemes determined by the fully-connected layer; and the target word set that can be formed by the phonemes at each time point is determined according to the pronunciation dictionary.

Step 807. Determine a probability of at least one second candidate sequence formed by the target word set.

The target word set is inputted into a language model to determine at least one second candidate sequence and a probability corresponding to the at least one second candidate sequence. For example, the language model may be at least one of an n-gram language model, a feedforward neural network-based model, and a recurrent neural network-based model. The language model may calculate, when a second candidate sequence is formed by the target word set, a possibility of existence of the second candidate sequence.

Step 808. Generate a second word graph network based on the probability of the at least one second candidate sequence.

The second word graph network is generated from the second candidate words in the target word set according to the possibility of existence of the second candidate sequence, and the second word graph network is used for indicating a second candidate sequence set including second candidate words obtained based on the pronunciation.

Step 809. Generate a first confusion network based on the first word graph network.

A path with a highest weight is selected from the first word graph network as a first initial confusion network, where a node in a word graph network path is a node in the confusion network; other edges are gradually added to the first initial confusion network in an aligned manner, edges of the same position and the same first candidate word are merged, and the weights are added up to obtain the first confusion network.

Step 810. Generate a second confusion network based on the second word graph network.

A path with a highest weight is selected from the second word graph network as a second initial confusion network, where a node in a word graph network path is a node in the confusion network; other edges are gradually added to the second initial confusion network in an aligned manner, edges of the same position and the same second candidate word are merged, and the weights are added up to obtain the second confusion network.

Step 811. Perform weighted combination on the first confusion network and the second confusion network to obtain a target confusion network.

Each edge on the first word graph network is multiplied by a coefficient m, and each edge on the second word graph network is multiplied by a coefficient (1-m). A value range of m is [0, 1]. If m is greater than 0.5, the final processing result of the speech recognition model focuses on the processing result of the E2E network sub-model; if m is less than 0.5, the final processing result of the speech recognition model focuses on the processing result of the acoustic processing sub-model. The first word graph networks and the second word graph networks multiplied by the coefficients are merged. In an example, the confusion network corresponding to the weighted second word graph network is used as an initial confusion network, and with the initial confusion network is as a starting point, each edge on the weighted first word graph network is added to the initial confusion network in an aligned manner until all the edges are added, to obtain the target confusion network.

Step 812. Determine a candidate sequence with a highest sum of connection probabilities between the third candidate words in the target confusion network as a recognition result.

Each node of the target confusion network is traversed from left to right, and corresponding to candidate words with highest scores between two nodes are connected to form a path. The path is a highest-score path in the target confusion network, and a candidate sequence formed by the path is the recognition result of the speech content.

In this embodiment of this application, the recognition of the speech content is implemented by setting up a shared network, which combines advantages of the hybrid speech recognition system and the E2E speech recognition system.

Figure 9:
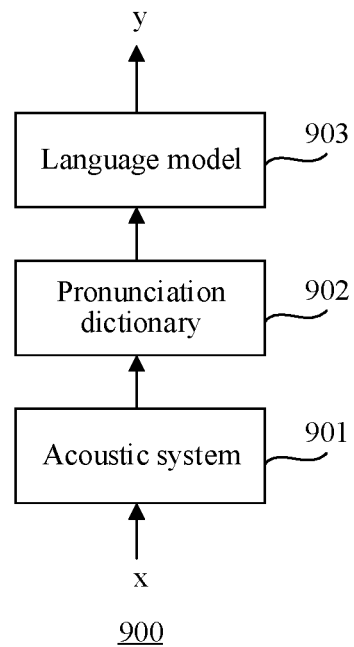
FIG. 9 is a schematic diagram of a hybrid speech recognition system according to an exemplary embodiment of this application.

The hybrid speech recognition refers to a manner of converting speech information into text information by sequentially mapping speech features, phonemes, words, and strings; the hybrid speech recognition system includes an acoustic model (AM), a pronunciation dictionary, a language model (LM) and other models. As shown in FIG. 9, the hybrid speech recognition system 900 includes an acoustic model 901, a pronunciation dictionary 902, and a language model 903. The server can perform feature extraction on to-be-recognized speech information to obtain a speech feature sequence, and input the speech feature sequence to the hybrid speech recognition system 900 to acquire text information outputted by the speech recognition system 900 corresponding to the speech information.

The acoustic model refers to a model for calculating a mapping probability between a speech feature and a phoneme. A phoneme is the smallest phonetic unit divided according to a natural attribute of speech. The natural attribute of the speech includes a physical attribute and a physiological attribute. The physical attribute includes sound pitch (a level of sound, which depends on a vibration frequency of a pronunciation body and is proportional to the vibration frequency of the pronunciation body), sound intensity (strength of sound, which depends on vibration amplitude of the pronunciation body and is proportional to the vibration amplitude of the pronunciation body), sound length (a length of sound, which depends on the length of vibration time of the pronunciation body and is proportional to the vibration time of the pronunciation body), sound quality (a feature or characteristic of sound, also called timbre, which depends on a vibration form of the pronunciation body). The physiological attribute indicates a physiological pronunciation position and the pronunciation motion. In terms of the physical attribute, the phoneme is the smallest phonetic unit divided based on the sound quality, while in terms of the physiological attribute, the phoneme is the smallest phonetic unit divided according to the pronunciation motion. That is, a pronunciation action forms a phoneme. For example, the pronunciation (a) corresponding to "啊" has one phoneme, and the pronunciation "ài" corresponding to "爱" has two phonemes. The pronunciation dictionary includes a word set which can be processed by the speech recognition system and pronunciations corresponding to the words in the word set, and provides a mapping between an acoustic modeling unit and the language model unit. The language model refers to a model for calculating a probability of a word-to-string mapping, that is, for estimating, when recognized words are combined into a target text, a possibility of existence of the target text.

Figure 10:
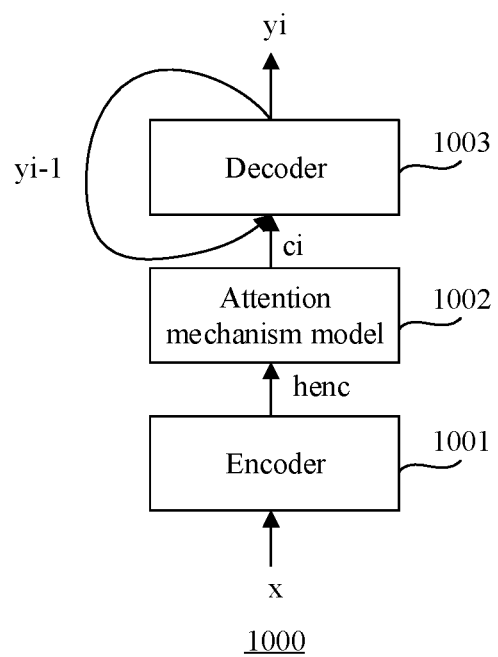
FIG. 10 is a schematic diagram of an E2E speech recognition system according to an exemplary embodiment of this application.

The E2E speech recognition refers to end-to-end speech recognition. The E2E speech recognition system does not include independent acoustic model, pronunciation dictionary, language model and the like. Instead, a direct connection is formed from an input end (speech feature sequence) to an output end (word string sequence) through a neural network, which replaces the speech recognition system of all the original models. For example, the neural network may be a network model built based on a multi-head attention mechanism (MHA). As shown in FIG. 10, the E2E speech recognition system 1000 includes an encoder 1001, an attention model 1002, and a decoder 1003. The server can perform feature extraction on to-be-recognized speech information to obtain a speech feature sequence, and input the speech feature sequence to the E2E speech recognition system 1000 to obtain text information outputted by the speech recognition system 1000 corresponding to the speech information.

In an example, the system for implementing the speech recognition method provided by the embodiments of this application (that is, a shared network system combination, SNSC for short), the hybrid speech recognition system, and the E2E speech recognition system are tested by the same physical machine to obtain the test results shown in Table 1, where a word error rate indicates that a number of incorrect words per 100 words recognized, and a real time factor (RTF) is a value for measuring a decoding speed of the speech recognition system. When the real time factor is less than or equal to 1, it is considered that the processing is real-time. From the results in Table 1, it can be seen that the SNSC system has a lower word error rate than the Hybrid speech recognition system and the E2E speech recognition system, and the real time factor measured by the SNSC system is less than a sum of the real time factors of the Hybrid speech recognition system and the E2E speech recognition system, which meets a service deployment requirement that the real time factor needs to be less than 1. That is, the speech recognition method provided in the embodiments of this application has high efficiency and accuracy, and a low real time factor that meets a service deployment condition.

TABLE 1

| Test set | Performance indicator | Hybrid speech recognition system | E2E speech recognition System | SNSC system |
|---|---|---|---|---|
| Clean | Average real time factor | 0.368 | 0.434 | 0.554 |
|  | Average word error rate | 7 | 6.8 | 5.1 |
| Noise | Average real time factor | 0.484 | 0.534 | 0.725 |
|  | Average word error rate | 14.2 | 13.9 | 13.4 |

In summary, in the speech recognition method provided in the embodiments of this application, for a to-be-recognized speech content, feature extraction is performed on the speech content to obtain an intermediate feature that can indicate an audio expression characteristic of the speech content. Then the intermediate feature is processed in two different manners, using two different speech recognition systems—the E2E speech recognition system and the hybrid recognition system—to obtain two word graph networks, where the two different processing manners include decoding the intermediate feature based on an attention mechanism to obtain a first word graph network, and performing feature mapping based on pronunciation of the speech content to obtain a second word graph network, the first word graph network and second word graph network being used for indicating candidate sequence sets including candidate words obtained in the foregoing two processing manners. Finally, a recognition result is determined according to candidate word connection relationships indicated by the first word graph network and the second word graph network, so as to implement the function of converting the speech content into a text content. Because the first word graph network and the second word graph network are obtained based on the same intermediate feature, server resources can be saved. In addition, the intermediate feature is processed in different manners, and a processing result is determined jointly according to the word graph networks obtained in the two processing manners, which improves the accuracy of the speech recognition.

Figure 11:
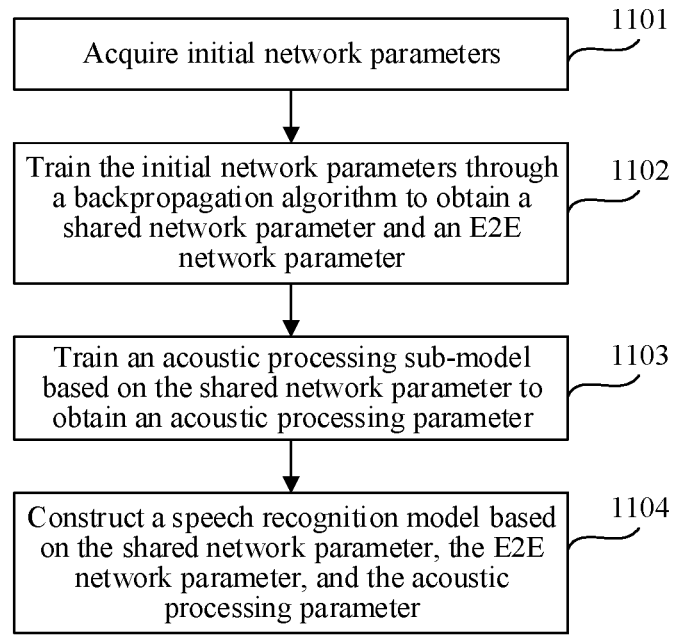
FIG. 11 is a flowchart of a training method of a speech recognition model according to an exemplary embodiment of this application.

FIG. 11 is a flowchart of a training method of a speech recognition model according to an exemplary embodiment of this application. In this embodiment of this application, each functional sub-model in the speech recognition model is trained to obtain a speech recognition model for recognizing a speech content. The method includes the following steps.

Step 1101. Acquire initial network parameters.

The initial network parameters are initialization parameters for a shared network sub-model and an E2E network sub-model. For example, a first training network includes the shared network sub-model and the E2E network sub-model. The shared network sub-model and the E2E network sub-model can form an E2E speech recognition system, where the shared network sub-model is implemented as an encoder in the E2E speech recognition system. The shared network sub-model includes two parts: a convolutional neural network and a transformer, and the E2E network sub-model includes two parts: an attention processing layer and a decoder. The initial network parameters include initial parameters of the convolutional neural network, the transformer, the attention processing layer and the decoder. For example, the initial network parameters are randomly generated by the system.

Step 1102. Train the initial network parameters through a backpropagation algorithm to obtain a shared network parameter and an E2E network parameter.

For example, the initial network parameters may also be trained through a gradient descent method or other training methods. The backpropagation algorithm is merely used as an example for description. The backpropagation algorithm (BP algorithm) is a learning algorithm suitable for multi-layer neuronal networks. In an example, training data for training the initial network parameters may be sample data of speech information-text information stored in a database, or sample data of speech information-text information obtained from a network. During training, samples in the training data are submitted one after another to the first training network including the shared network sub-model and the E2E network sub-model. The first training network performs computing on a sample input x to obtain an output y, obtains an error value between a target value in the sample and y through a loss function, then obtains a gradient of the loss function and updates all weight value of the first training network. For each sample submitted to the neural network, all the weight values are updated once by using an update function corresponding to the loss function, until error values corresponding to all the samples are less than a preset threshold value, that is, training is performed until convergence. In this embodiment of this application, the first training network is first trained using a cross entropy loss function (CE Loss) until convergence, and then trained using a minimum word error rate loss function until convergence again. Then, training is finished, to obtain parameters corresponding to the first training network. The parameters corresponding to the first training network include a shared network parameter corresponding to the shared network sub-model and an E2E network parameter corresponding to the E2E network sub-model.

Step 1103. Train an acoustic processing sub-model based on the shared network parameter to obtain an acoustic processing parameter.

The shared network sub-model and the acoustic processing sub-model can form a hybrid speech recognition system. The shared network sub-model and a fully-connected layer in the acoustic processing sub-model jointly act as an acoustic model part of the hybrid speech recognition system. The shared network sub-model and the acoustic processing sub-model together form a to-be-trained second training network. The shared network parameter of the shared network sub-model that has been trained is used as a partial parameter of the second training network, to participate in the training process of the second training network. The training process of the second training network includes: on the basis of the determined shared network parameter, completing random initialization of the fully-connected layer, then training the second training network until convergence by using the cross entropy loss function on an aligned corpus, and further performing discriminant training on a prepared word graph network until convergence, thus completing the training to obtain the acoustic processing parameter corresponding to the acoustic processing sub-model. The training data (aligned corpus and word graph networks) included in the foregoing process can be read from the database.

That is, in the training process of the speech recognition model, the first training network including the shared network sub-model and the E2E network sub-model is first trained, and then the second training network including the shared network sub-model and the acoustic processing sub-model is trained.

Step 1104. Construct a speech recognition model based on the shared network parameter, the E2E network parameter, and the acoustic processing parameter.

The shared network sub-model is constructed based on the shared network parameter, the E2E network sub-model is constructed based on the E2E network parameter, and the acoustic processing sub-model is constructed based on the acoustic processing parameter. Finally, the speech recognition model is formed jointly by the shared network sub-model, the E2E network sub-model, the acoustic processing sub-model and the result generation sub-model.

In summary, in the training method of a speech recognition model provided in the embodiments of this application, network parameters of a shared network sub-model and an E2E network sub-model are first obtained by training an E2E speech recognition system from scratch. Then, the shared network parameter corresponding to the shared network sub-model is used in training of an acoustic processing sub-model. The shared network sub-model and the acoustic processing sub-model are trained as a hybrid speech recognition system to obtain a network parameter of the acoustic processing sub-model, and then a speech recognition model is constructed by using the foregoing parameters obtained through training, so that the trained speech recognition model can not only ensure the accuracy of speech recognition, but also reduce server resources occupied by the whole speech recognition model.

The information (including, but not limited to, user equipment information, user personal information, etc.), the data (including, but not limited to, data for analysis, stored data, displayed data, etc.), and the signals involved in this application all are authorized by the user or fully authorized by each party, and the collection, use, and processing of relevant data need to comply with relevant laws and regulations of relevant countries and regions. For example, the speech content and model training data involved in this application are all obtained with full authorization.

Figure 12:
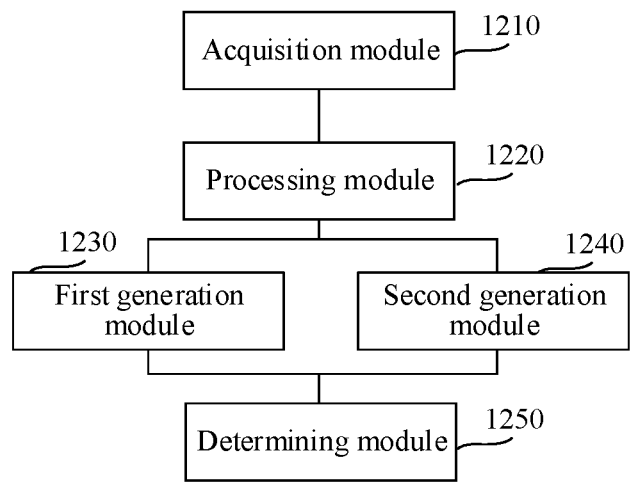
FIG. 12 is a structural block diagram of a speech recognition apparatus according to an exemplary embodiment of this application.

FIG. 12 is a structural block diagram of a speech recognition apparatus according to an exemplary embodiment of this application. The apparatus includes the following modules:

an acquisition module 1210, configured to acquire a speech content, where the speech content is a to-be-recognized audio;

a processing module 1220, configured to perform feature extraction on the speech content to obtain an intermediate feature, the intermediate feature being used for indicating an audio expression characteristic of the speech content;

a first generation module 1230, configured to decode the intermediate feature based on an attention mechanism to obtain a first word graph network, the first word graph network being used for indicating a first candidate sequence set that includes first candidate words predicted based on the attention mechanism;

a second generation module 1240, configured to perform feature mapping on the intermediate feature based on pronunciation of the speech content to obtain a second word graph network, the second word graph network being used for indicating a second candidate sequence set that includes second candidate words obtained based on the pronunciation; and a determining module 1250, configured to determine a recognition result of the speech content according to candidate word connection relationships indicated by the first word graph network and the second word graph network.

In some embodiments, the processing module 1220 is further configured to perform feature extraction on the speech content through at least one layer of convolutional neural network to obtain intermediate sub-features; and the processing module 1220 is further configured to perform feature weighting on the intermediate sub-features to obtain the intermediate feature.

Figure 13:
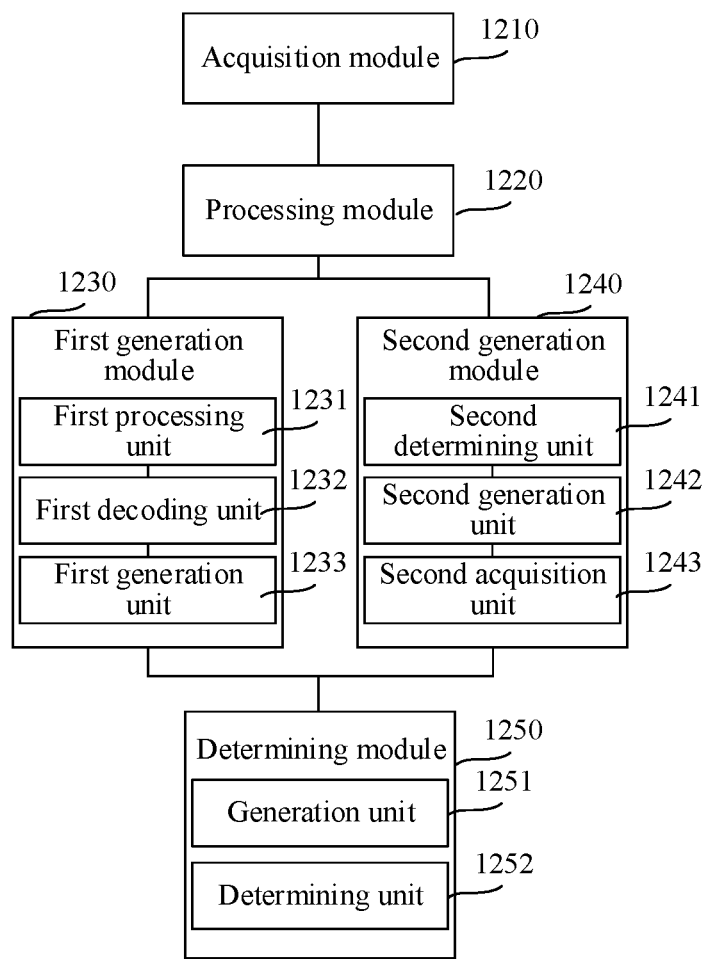
FIG. 13 is a structural block diagram of a speech recognition apparatus according to another exemplary embodiment of this application.

In some embodiments, referring to FIG. 13, the first generation module 1230 further includes:

a first processing unit 1231 is configured to perform, based on the attention mechanism, feature weighting on channels indicating human speech expressions in the intermediate feature to obtain a first branch feature; and a first decoding unit 1232 is configured to decode the first branch feature to obtain the first word graph network.

In some embodiments, the first decoding unit 1232 is further configured to decode the first branch feature through a decoder to obtain the first candidate sequence set; and the first generation module 1230 further includes:

a first generation unit 1233, configured to generate the first word graph network by using the first candidate words corresponding to the first candidate sequence set as paths.

In some embodiments, the second generation module 1240 further includes:

a second determining unit 1241, configured to determine a target word set of the to-be-recognized speech based on the intermediate feature; and a second generation unit 1242, configured to generate the second word graph network based on the target word set.

In an optional embodiment, the second determining unit 1241 is further configured to input the intermediate feature to a fully-connected layer to obtain posterior probabilities of phonemes of the to-be-recognized speech, the phoneme being used for indicating a minimum phonetic unit divided according to a natural attribute of the speech; and the second determining unit 1241 is further configured to determine the target word set based on the posterior probabilities of the phonemes.

In some embodiments, the second generation module 1240 further includes:

a second acquisition unit 1243, configured to acquire a pronunciation dictionary, the pronunciation dictionary including a mapping relationship between words and pronunciations;

the second determining unit 1241 is further configured to determine phonemes at each time point in the speech content according to the posterior probabilities of the phonemes; and the second determining unit 1241 is further configured to determine the target word set that includes phonemes at each time point according to the pronunciation dictionary.

In some embodiments, the second determining unit 1241 is further configured to determine a probability of at least one second candidate sequence formed by the target word set; and the second generation unit 1242 is further configured to generate the second word graph network based on the probability of the at least one second candidate sequence.

In some embodiments, the determining module 1250 further includes:

a generation unit 1251, configured to generate a target confusion network based on the first word graph network and the second word graph network, the target confusion network including connection probabilities between third candidate words forming a candidate sequence, the third candidate words being determined from the first candidate words and the second candidate words, the connection probabilities between the third candidate words being obtained by performing weighted combination on first connection relationships between the first candidate words and second connection relationships between the second candidate words; and a determining unit 1252, configured to determine a candidate sequence with a highest sum of connection probabilities between the third candidate words in the target confusion network as the recognition result.

In some embodiments, the generation unit 1251 is further configured to generate a first confusion network based on the first word graph network, the first confusion network including connection probabilities between the first candidate words in the first candidate sequence set;

the generation unit 1251 is further configured to generate a second confusion network based on the second word graph network, the second confusion network including connection probabilities between the second candidate words in the second candidate sequence set; and the determining unit 1252 is further configured to perform weighted combination on the first confusion network and the second confusion network to obtain the target confusion network.

In summary, the speech recognition apparatus provided in the embodiments of this application, for a to-be-recognized speech content, feature extraction is performed on the speech content to obtain an intermediate feature that can indicate an audio expression characteristic of the speech content. Then the intermediate feature is processed in two different manners to obtain two word graph networks, where the two different processing manners include decoding the intermediate feature based on an attention mechanism to obtain a first word graph network, and performing feature mapping based on pronunciation of the speech content to obtain a second word graph network, the first word graph network and second word graph network being used for indicating candidate sequence sets including candidate words obtained in the foregoing two processing manners. Finally, a recognition result is determined according to candidate word connection relationships indicated by the first word graph network and the second word graph network, so as to implement the function of converting the speech content into a text content. Because the first word graph network and the second word graph network are obtained based on the same intermediate feature, server resources can be saved. In addition, the intermediate feature is processed in different manners, and a processing result is determined jointly according to the word graph networks obtained in the two processing manners, which improves the accuracy of the speech recognition.

The speech recognition apparatus provided in the foregoing embodiments is illustrated with an example of division of the foregoing functional modules. In actual application, the functions may be allocated to and completed by different functional modules according to requirements, that is, the internal structure of the device is divided into different functional modules, to implement all or some of the functions described above. In addition, the speech recognition apparatus and speech recognition method embodiments provided in the foregoing embodiments belong to the same conception. For the specific implementation process, reference may be made to the method embodiments, and details are not described herein again.

Figure 14:
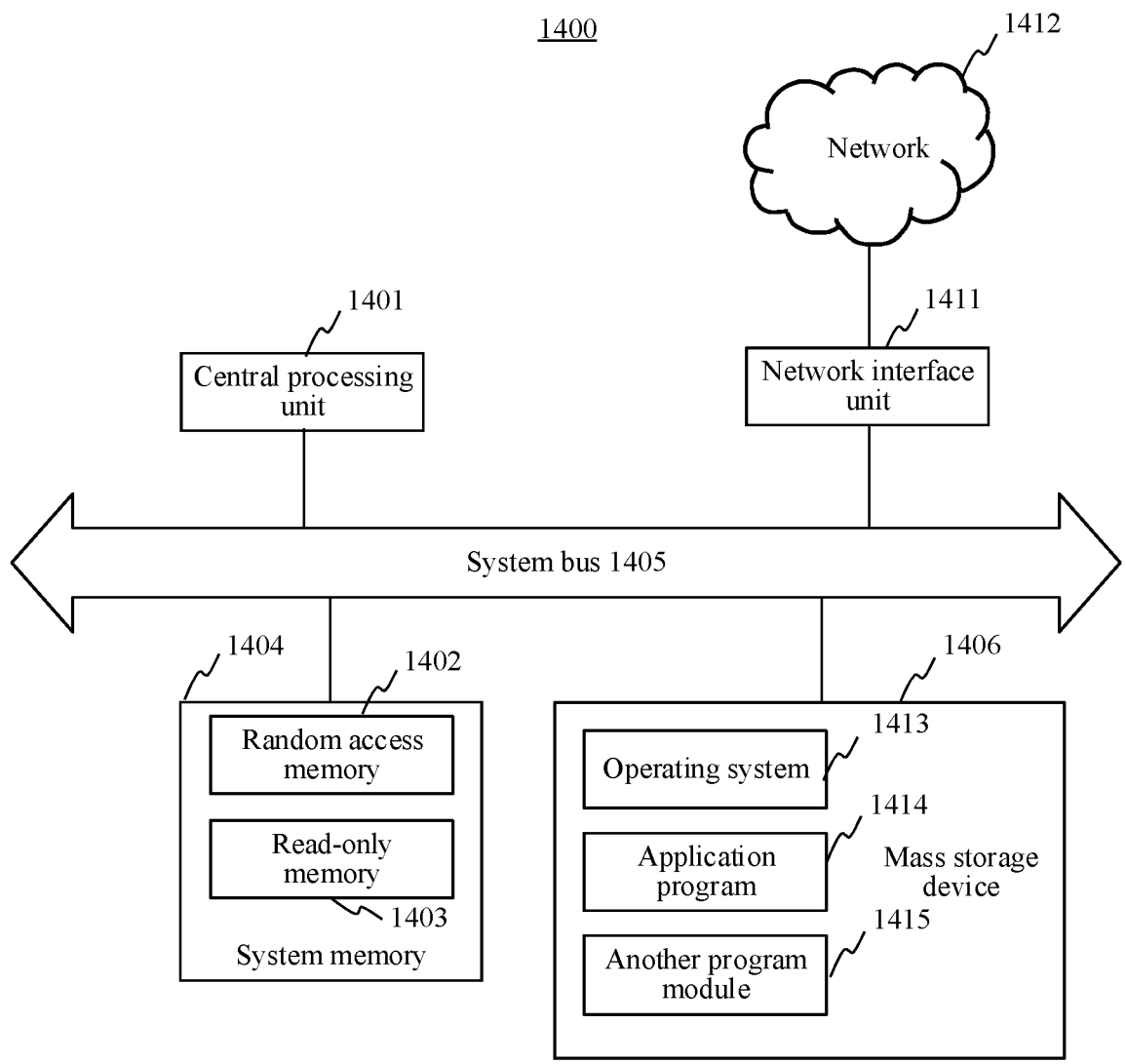
FIG. 14 is a schematic structural diagram of a server according to an exemplary embodiment of this application.

FIG. 14 is a schematic structural diagram of a server according to an exemplary embodiment of this application. The server may include the following structures.

The server 1400 includes a central processing unit (CPU) 1401, a system memory 1404 including a random access memory (RAM) 1402 and a read-only memory (ROM) 1403, and a system bus 1405 connecting the system memory 1404 to the CPU 1401. The server 1400 further includes a mass storage device 1406 configured to store an operating system 1413, an application program 1414, and another program module 1415.

Generally, the computer-readable medium may include a computer storage medium and a communication medium. The computer storage medium includes volatile and non-volatile, removable and non-removable media that are configured to store information such as computer-readable instructions, data structures, program modules, or other data and that are implemented by using any method or technology. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in the art may know that the computer storage medium is not limited to the foregoing several types. The foregoing system memory 1404 and mass storage device 1406 may be collectively referred to as a memory.

According to various embodiments of this application, the server 1400 may further be connected, by using a network such as the Internet, to a remote computer on the network and run. That is, the server 1400 may be connected to a network 1412 by using a network interface unit 1411 that is connected to the system bus 1405, or may be connected to a network of another type or a remote computer system (not shown) by using the network interface unit 1411.

The memory further includes one or more programs, which are stored in the memory and are configured to be executed by the CPU.

An embodiment of this application further provides a computer device. The computer device includes a processor and a memory, the memory storing at least one computer program, the at least one computer program being loaded and executed by the processor to implement the speech recognition method according to the foregoing method embodiments. In some embodiments, the computer device may be a terminal, or may be a server.

An embodiment of this application further provides a non-transitory computer-readable storage medium, storing at least one piece of program code, the at least one piece of program code being loaded and executed by a processor to implement the speech recognition method according to the foregoing method embodiments.

An embodiment of this application further provides a computer program product, including at least one computer program. A processor of a computer device reads the computer program from the computer program product, and executes the computer program, to implement the speech recognition method according to any one of the foregoing embodiments of this application.

In some embodiments, the computer-readable storage medium may include: a ROM, a RAM, a solid state drive (SSD), an optical disc, or the like. The RAM may include a resistance RAM (ReRAM) and a dynamic RAM (DRAM). The sequence numbers of the foregoing embodiments of this application are merely for description purpose, and do not indicate the preference among the embodiments.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs feature extraction and/or decoding. In practical application, the foregoing functions may be allocated to and completed by different functional modules according to requirements, that is, an inner structure of a device is divided into different functional modules to implement all or a part of the functions described above.

What is claimed is:

1. A speech recognition method, performed by a computer device, the method comprising:
   acquiring a speech content, wherein the speech content is audio content to be recognized;
   performing feature extraction on the speech content to obtain an intermediate feature, wherein the intermediate feature is used to indicate an audio expression characteristic of the speech content;
   decoding the intermediate feature based on an attention mechanism to obtain a first word graph network, wherein the first word graph network is used to indicate a first candidate sequence set comprising first candidate words predicted based on the attention mechanism;
   performing feature mapping on the intermediate feature based on pronunciation of the speech content to obtain a second word graph network, wherein the second word graph network is used to indicate a second candidate sequence set comprising second candidate words obtained based on the pronunciation; and
   determining a recognition result of the speech content according to a connection relationship indicated by the first word graph network and the second word graph network.

2. The method according to claim 1, wherein performing feature extraction on the speech content to obtain the intermediate feature comprises:
   performing feature extraction on the speech content through at least one layer of convolutional neural network to obtain intermediate sub-features; and
   performing feature weighting on the intermediate sub-features to obtain the intermediate feature.

3. The method according to claim 1, wherein decoding the intermediate feature based on the attention mechanism to obtain the first word graph network comprises:
   performing, based on the attention mechanism, feature weighting on channels indicating human speech expressions in the intermediate feature to obtain a first branch feature; and
   decoding the first branch feature to obtain the first word graph network.

4. The method according to claim 3, wherein decoding the first branch feature to obtain the first word graph network comprises:
   decoding the first branch feature through a decoder to obtain the first candidate sequence set; and
   generating the first word graph network by using the first candidate words corresponding to the first candidate sequence set as paths.

5. The method according to claim 1, wherein performing feature mapping on the intermediate feature based on pronunciation of the speech content to obtain the second word graph network comprises:
   determining a target word set of the speech content based on the intermediate feature; and
   generating the second word graph network based on the target word set.

6. The method according to claim 5, wherein determining the target word set of the speech content based on the intermediate feature comprises:
   inputting the intermediate feature to a fully-connected layer to obtain posterior probabilities of phonemes of the speech content, the phoneme being used for indicating a minimum phonetic unit divided according to a natural attribute of the speech content; and
   determining the target word set based on the posterior probabilities of the phonemes.

7. The method according to claim 6, wherein determining the target word set based on the posterior probabilities of the phonemes comprises:
   acquiring a pronunciation dictionary, the pronunciation dictionary comprising a mapping relationship between words and pronunciations;
   determining phonemes at each time point in the speech content according to the posterior probabilities of the phonemes; and
   determining the target word set comprising the phonemes at each time point according to the pronunciation dictionary.

8. The method according to claim 6, wherein generating the second word graph network based on the target word set comprises:
   determining a probability of at least one second candidate sequence formed by the target word set; and
   generating the second word graph network based on the probability of the at least one second candidate sequence.

9. The method according to claim 1, wherein determining the recognition result of the speech content according to candidate word connection relationships indicated by the first word graph network and the second word graph network comprises:
   generating a target confusion network based on the first word graph network and the second word graph network, the target confusion network comprising connection probabilities between third candidate words forming a candidate sequence, the third candidate words being determined from the first candidate words and the second candidate words, the connection probabilities between the third candidate words being obtained by performing weighted combination on first connection relationships between the first candidate words and second connection relationships between the second candidate words;
   determining a candidate sequence with a highest sum of the connection probabilities between the third candidate words in the target confusion network as the recognition result.

10. The method according to claim 9, wherein generating the target confusion network based on the first word graph network and the second word graph network comprises:
    generating a first confusion network based on the first word graph network, the first confusion network comprising connection probabilities between the first candidate words in the first candidate sequence set;
    generating a second confusion network based on the second word graph network, the second confusion network comprising connection probabilities between the second candidate words in the second candidate sequence set; and
    performing weighted combination on the first confusion network and the second confusion network to obtain the target confusion network.

11. A computer device, comprising:
    one or more processors; and
    memory storing one or more programs, the one or more programs comprising instructions that, when executed by the one or more processors, cause the one or more processors to perform operations comprising:
      acquiring a speech content, wherein the speech content is audio content to be recognized;
      performing feature extraction on the speech content to obtain an intermediate feature, wherein the intermediate feature is used to indicate an audio expression characteristic of the speech content;
  decoding the intermediate feature based on an attention mechanism to obtain a first word graph network, wherein the first word graph network is used to indicate a first candidate sequence set comprising first candidate words predicted based on the attention mechanism;
  performing feature mapping on the intermediate feature based on pronunciation of the speech content to obtain a second word graph network, wherein the second word graph network is used to indicate a second candidate sequence set comprising second candidate words obtained based on the pronunciation; and
  determining a recognition result of the speech content according to a connection relationship indicated by the first word graph network and the second word graph network.

12. The computer device according to claim 11, wherein performing feature extraction on the speech content to obtain the intermediate feature comprises:
  performing feature extraction on the speech content through at least one layer of convolutional neural network to obtain intermediate sub-features; and
  performing feature weighting on the intermediate sub-features to obtain the intermediate feature.

13. The computer device according to claim 11, wherein decoding the intermediate feature based on the attention mechanism to obtain the first word graph network comprises:
  performing, based on the attention mechanism, feature weighting on channels indicating human speech expressions in the intermediate feature to obtain a first branch feature; and
  decoding the first branch feature to obtain the first word graph network.

14. The computer device according to claim 13, wherein decoding the first branch feature to obtain the first word graph network comprises:
  decoding the first branch feature through a decoder to obtain the first candidate sequence set; and
  generating the first word graph network by using the first candidate words corresponding to the first candidate sequence set as paths.

15. The computer device according to claim 11, wherein performing feature mapping on the intermediate feature based on pronunciation of the speech content to obtain the second word graph network comprises:
  determining a target word set of the speech content based on the intermediate feature; and
  generating the second word graph network based on the target word set.

16. The computer device according to claim 15, wherein determining the target word set of the speech content based on the intermediate feature comprises:
  inputting the intermediate feature to a fully-connected layer to obtain posterior probabilities of phonemes of the speech content, the phoneme being used for indicating a minimum phonetic unit divided according to a natural attribute of the speech content; and
  determining the target word set based on the posterior probabilities of the phonemes.

17. The computer device according to claim 16, wherein determining the target word set based on the posterior probabilities of the phonemes comprises:
  acquiring a pronunciation dictionary, the pronunciation dictionary comprising a mapping relationship between words and pronunciations;
  determining phonemes at each time point in the speech content according to the posterior probabilities of the phonemes; and
  determining the target word set comprising the phonemes at each time point according to the pronunciation dictionary.

18. The computer device according to claim 16, wherein generating the second word graph network based on the target word set comprises:
  determining a probability of at least one second candidate sequence formed by the target word set; and
  generating the second word graph network based on the probability of the at least one second candidate sequence.

19. A non-transitory computer-readable storage medium, storing one or more instructions, the one or more instructions, when executed by one or more processors of a computer device, cause the one or more processors to perform operations comprising:
  acquiring a speech content, wherein the speech content is audio content to be recognized;
  performing feature extraction on the speech content to obtain an intermediate feature, wherein the intermediate feature is used to indicate an audio expression characteristic of the speech content;
  decoding the intermediate feature based on an attention mechanism to obtain a first word graph network, wherein the first word graph network is used to indicate a first candidate sequence set comprising first candidate words predicted based on the attention mechanism;
  performing feature mapping on the intermediate feature based on pronunciation of the speech content to obtain a second word graph network, wherein the second word graph network is used to indicate a second candidate sequence set comprising second candidate words obtained based on the pronunciation; and
  determining a recognition result of the speech content according to a connection relationship indicated by the first word graph network and the second word graph network.

20. The non-transitory computer-readable storage medium according to claim 19, wherein determining the recognition result of the speech content according to candidate word connection relationships indicated by the first word graph network and the second word graph network comprises:
  generating a target confusion network based on the first word graph network and the second word graph network, the target confusion network comprising connection probabilities between third candidate words forming a candidate sequence, the third candidate words being determined from the first candidate words and the second candidate words, the connection probabilities between the third candidate words being obtained by performing weighted combination on first connection relationships between the first candidate words and second connection relationships between the second candidate words;
  determining a candidate sequence with a highest sum of the connection probabilities between the third candidate words in the target confusion network as the recognition result.

* * * * *